United States Patent
Hwang et al.

(10) Patent No.: US 8,402,200 B2
(45) Date of Patent: Mar. 19, 2013

(54) METHOD AND APPARATUS FOR STORING AND RESTORING STATE OF VIRTUAL MACHINE

(75) Inventors: Joo-young Hwang, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1025 days.

(21) Appl. No.: 12/129,122

(22) Filed: May 29, 2008

(65) Prior Publication Data

US 2009/0182929 A1 Jul. 16, 2009

(30) Foreign Application Priority Data

Jan. 16, 2008 (KR) .................. 10-2008-0004913

(51) Int. Cl.
*G06F 12/00* (2006.01)
(52) U.S. Cl. ............... 711/6; 711/154; 711/203
(58) Field of Classification Search .............. 711/6, 154, 711/203
See application file for complete search history.

(56) References Cited

U.S. PATENT DOCUMENTS

| | | | |
|---|---|---|---|
| 6,799,258 B1 * | 9/2004 | Linde .......................... | 711/162 |
| 6,941,410 B1 | 9/2005 | Traversat et al. | |
| 7,203,944 B1 | 4/2007 | Van Rietschote et al. | |
| 7,257,811 B2 | 8/2007 | Hunt et al. | |
| 2005/0251802 A1 | 11/2005 | Bozek et al. | |
| 2007/0168627 A1 * | 7/2007 | In et al. ......................... | 711/159 |
| 2009/0024813 A1 * | 1/2009 | Uysal et al. .................. | 711/162 |

FOREIGN PATENT DOCUMENTS

KR 10-2007-0008668 A 1/2007

OTHER PUBLICATIONS

Sapuntzakis et al., Optimizing the Migration of Virtual Computers, Dec. 2002, The USENIX Association, 5th Symposium on Operating Systems Design and Implementations, pp. 1-15.*
Clark, et al., "Live Migration of Virtual Machines", Migration NSDI Pre, 2005, total 14 pages.

* cited by examiner

*Primary Examiner* — Matthew Bradley
(74) *Attorney, Agent, or Firm* — Sughrue Mion, PLLC

(57) ABSTRACT

Provided is a method and apparatus for storing and restoring a state of a virtual machine on a virtual machine monitor. The method of storing a state of a second virtual machine in a predetermined storage device by a first virtual machine on a virtual machine monitor includes determining whether the state of the second virtual machine has changed, by comparing a previous state of the second virtual machine, which has already been stored in the storage device, with a current state of the second virtual machine and selectively storing the state of the second virtual machine based on a result of the determination, thereby minimizing time required to store or restore the state of the second virtual machine.

19 Claims, 7 Drawing Sheets

METHOD AND APPARATUS FOR STORING AND RESTORING STATE OF VIRTUAL MACHINE

CROSS-REFERENCE TO RELATED PATENT APPLICATION

This application claims the benefit of Korean Patent Application No. 10-2008-0004913, filed on Jan. 16, 2008, in the Korean Intellectual Property Office, the disclosure of which is incorporated herein in its entirety by reference.

BACKGROUND OF THE INVENTION

1. Field of the Invention

Methods and apparatuses consistent with the present invention generally relate to storing and restoring a state of a virtual machine operating on a virtual machine monitor, and more particularly, to a method and apparatus for storing and restoring the state of the virtual machine while minimizing time consumption.

2. Description of the Related Art

Hardware platforms based on a general-purpose central processing unit (CPU) are originally designed to run a single operating system (OS). However, a computer running a single OS can use only about 5-10% of total maximum hardware performance instead of using the total maximum hardware performance itself.

Inefficiency in using hardware becomes more serious for business servers. Such inefficiency increases information technology (IT) costs of businesses. To solve this problem, virtual techniques for allowing a plurality of OSs to share hardware resources have been steadily developed.

One of techniques for providing a plurality of identical execution environments within a single hardware platform is a virtual machine monitor. The virtual machine monitor creates a plurality of virtual machines that operate independently in single hardware and allows the plurality of virtual machines to share hardware resources. Each of the virtual machines is a virtualized system that runs its own OS and is an independent object that is not affected by another virtual machine on the virtual machine monitor, as will be described in detail with reference to FIGS. 1A and 1B.

FIGS. 1A and 1B illustrate a virtual machine monitor and virtual machines according to the related art.

Referring to FIG. 1A, a virtual machine monitor 112 virtualizes hardware resources of a hardware platform A 110 in order to allow a plurality of first and second virtual machines 114 and 116 to share the hardware resources of the hardware platform A 110. The first and second virtual machines 114 and 116 are independent objects and run independent OSs by using the virtualized hardware resources.

The OSs that are run on the first and second virtual machines 114 and 116 request the virtual machine monitor 112 to grant an access to the hardware platform A 110, and the virtual machine monitor 112 relays the first and second virtual machines 114 and 116 to the hardware platform A 110. In a system that does not implement the virtual machine monitor 112, the OSs of the first and second virtual machines 114 and 116 can directly access to the hardware platform A 110. However, in a system that implements the virtual machine monitor 112, the OSs of the first and second virtual machines 114 and 116 can access to the hardware platform A 110 only through the virtual machine monitor 112.

FIG. 1B illustrates a case where the second virtual machine 116 operating in the hardware platform A 110 is moved to a hardware platform B 120. In order to move the second virtual machine 116 operating in the hardware platform A 110, as illustrated in FIG. 1A, to the hardware platform B 120 as illustrated in FIG. 1B, a state of the second virtual machine 116 in the hardware platform A 110 has to be stored and then be restored in the hardware platform B 120.

The stored and then restored state of the second virtual machine 116 may include a CPU register state and a device register state in the hardware platform A 110, and data stored in a system memory that has been allocated to the second virtual machine 116 by the virtual machine monitor 112 and has been used by the second virtual machine 116.

According to the related art, the state of the second virtual machine 116 in the hardware platform A 110 is first stored in a predetermined storage device and then is restored in the hardware platform B 120.

However, since the CPU register state, the device register state, and the data stored in the system memory are collectively stored and then restored according to the related art, too much time is consumed in storing and restoring the state of the second virtual machine 116. Moreover, if a memory size of the hardware platform B 120 in which the state of the second virtual machine 116 is to be restored is smaller than that of the hardware platform A 110, the state of the second virtual machine 116 cannot be restored.

Therefore, there is a need for a method and apparatus for storing and restoring a state of a virtual machine while minimizing time delay in moving the virtual machine to different hardware.

SUMMARY OF THE INVENTION

The present invention provides a method and apparatus for storing and restoring a state of a virtual machine whereby the state of the virtual machine on a virtual machine monitor can be efficiency stored and restored in order to minimize time consumed in moving the virtual machine to different hardware, and a computer-readable recording medium having recorded thereon a program for executing the method.

According to an aspect of the present invention, there is provided a method of storing a state of a second virtual machine in a predetermined storage device by a first virtual machine on a virtual machine monitor. The method includes determining whether the state of the second virtual machine has changed, by comparing a previous state of the second virtual machine, which has already been stored in the storage device, with a current state of the second virtual machine and selectively storing the state of the second virtual machine based on a result of the determination.

The state of the second virtual machine may be data stored in a memory portion allocated to the second virtual machine, and the determination may include determining whether any one of memory pages of the memory, which have already been stored in the storage device, has changed, by comparing the memory pages with current memory pages, and the selective storing of the state may include storing only data of the changed memory page in the storage device.

The storing of only data of the changed memory page may include calculating a difference between data of a memory page that has already been stored in the storage device and the data of the changed memory page and storing the difference in the storage device.

The state of the second virtual machine may include at least one of a state of a central processing unit (CPU) register and a state of a device register of the second virtual machine.

According to another aspect of the present invention, there is provided a method of restoring a state of a virtual machine, which is stored in a predetermined storage device, by a virtual machine monitor. The method includes receiving a request for an access to data of a predetermined memory page from the virtual machine, determining whether the predetermined memory page has already been restored, and allocating an additional memory portion for restoring the predetermined memory page and storing the access-requested data in the allocated memory portion according to a result of the determination.

The allocating the memory portion and the storing of the access-requested data may include allocating the additional memory portion for restoring the predetermined memory page to the virtual machine if it is determined that the predetermined memory page has not yet been restored, receiving the access-requested data of the memory page from the storage device, and storing the received data in the allocated additional memory portion.

The allocating the memory portion and the storing of the access-requested data may include allocating a memory portion that has been allocated to a least recently used memory page for restoring the predetermined memory page if it is determined that the predetermined memory page has not yet been restored, receiving the access-requested data of the memory page from the storage device, and storing the received data in the allocated memory portion.

According to another aspect of the present invention, there is provided an apparatus for storing a state of a second virtual machine in a predetermined storage device by a first virtual machine on a virtual machine monitor. The apparatus includes a control unit determining whether the state of the second virtual machine has changed, by comparing a previous state of the second virtual machine, which has already been stored in the storage device, with a current state of the second virtual machine and a storing unit selectively storing the state of the second virtual machine based on a result of the determination.

According to another aspect of the present invention, there is provided an apparatus for restoring a state of a virtual machine, which is stored in a predetermined storage device, by a virtual machine monitor. The apparatus includes a control unit receiving a request for an access to data of a predetermined memory page from the virtual machine, determining whether the predetermined memory page has already been restored, and allocating an additional memory portion for restoring the predetermined memory page and a storing unit storing the access-requested data in the allocated memory portion according to a result of the determination.

According to another aspect of the present invention, there is provided a computer-readable recording medium having recorded thereon a program for executing the method of storing the state of the second virtual machine and the method of restoring the state of the virtual machine.

BRIEF DESCRIPTION OF THE DRAWINGS

The above and other features of the present invention will become more apparent by describing in detail embodiments thereof with reference to the attached drawings in which.

DETAILED DESCRIPTION OF THE INVENTION

Figure 1A:
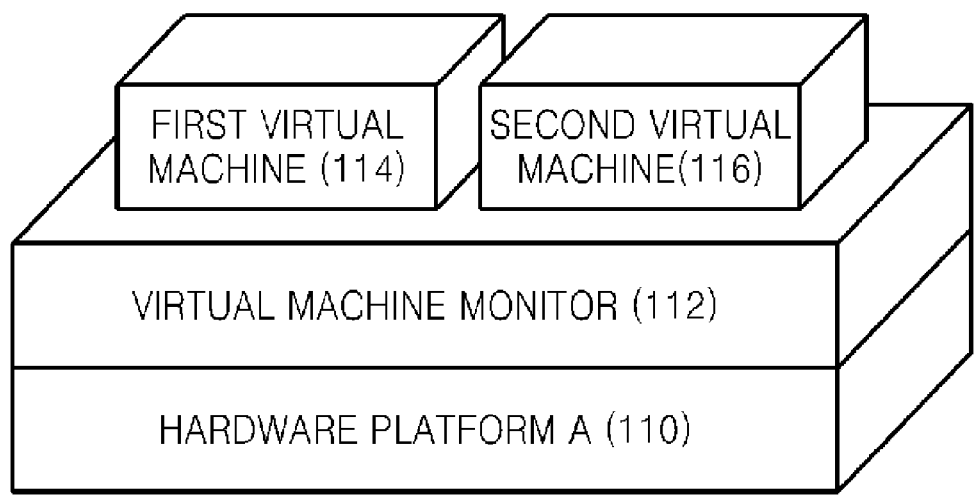
FIGS. 1A and 1B illustrate a virtual machine monitor and virtual machines according to the related art.
Figure 1B:
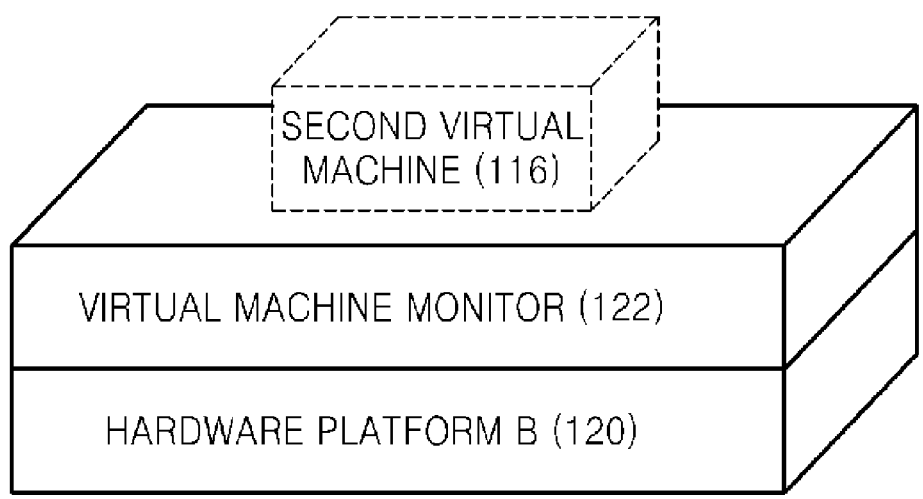

Hereinafter, embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

Figure 2:
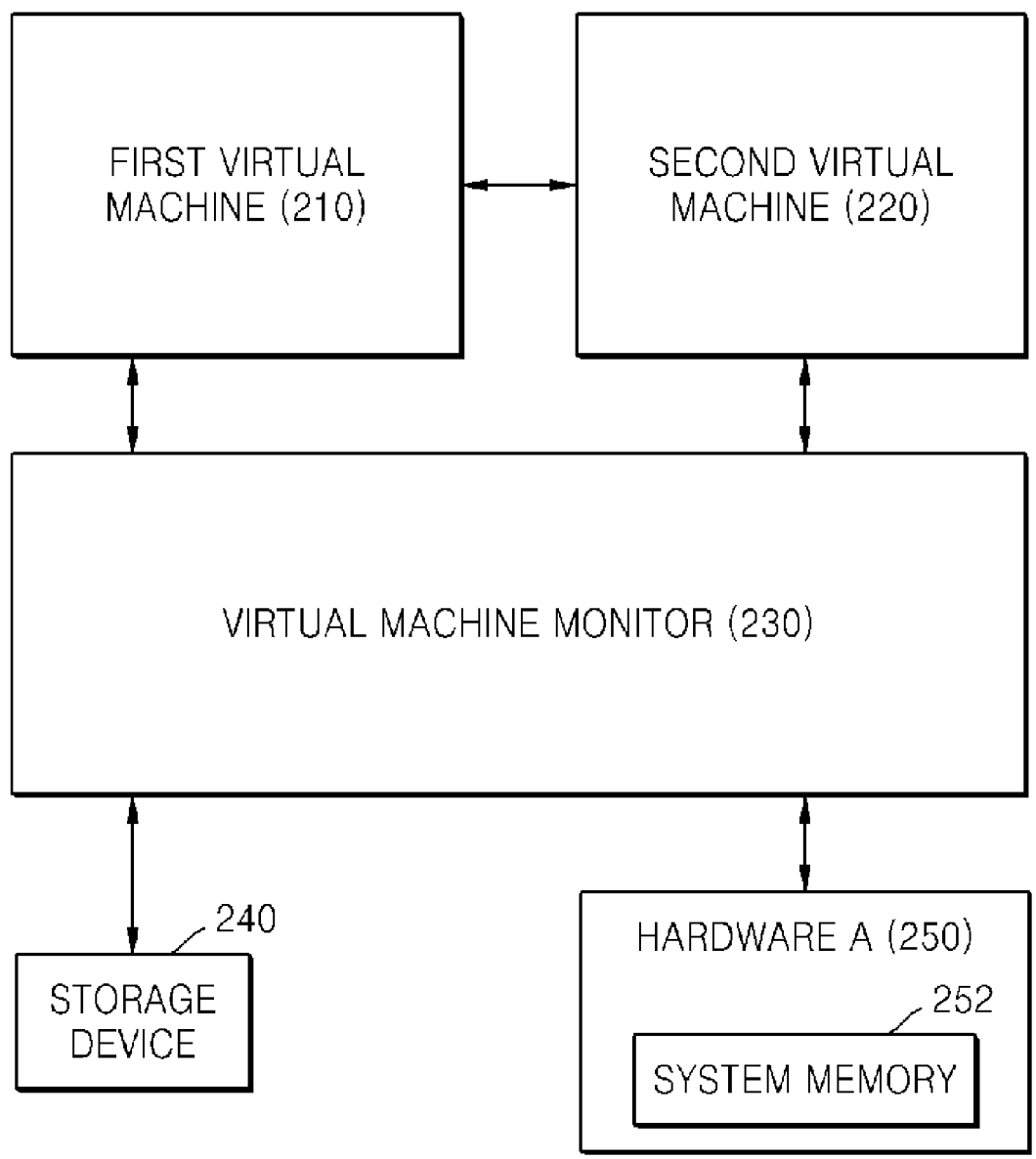
FIG. 2 illustrates a virtual machine monitor and virtual machines according to an embodiment of the present invention.

FIG. 2 illustrates a plurality of virtual machines 210 and 220 and a virtual machine monitor 230 according to an embodiment of the present invention.

In FIG. 2, while the plurality of virtual machines, i.e., a first virtual machine 210 and a second virtual machine 220, is operating by sharing resources of single hardware A 260 through the virtual machine monitor 230, a state of the second virtual machine 220 is stored in a storage device 240.

The virtual machine monitor 230 relays an operating system (OS) of the first virtual machine 210 and an OS of the second virtual machine 220 to the hardware A 260 in order to allow the OSs to access the resources of the hardware A 260. The virtual machine monitor 230 virtualizes the resources of the hardware A 260 in order to allow the first virtual machine 210 and the second virtual machine 220 to share the resources of the hardware A 260. The shared resources may include a central processing unit (CPU), a system memory 252, and the like.

The first virtual machine 210, which is a virtual machine in a control domain, stores the state of the second virtual machine 220 in the storage device 240. To store the state of the second virtual machine 220 in the storage device 240, the first virtual machine 210 executes a predetermined storing/restoring application. The first virtual machine 210 has a storage device driver capable of accessing the storage device 240 and thus can access the storage device 240 through the virtual machine monitor 230.

The second virtual machine 220, which is a virtual machine in a guest domain, executes a predetermined application. Since the second virtual machine 220 has no storage device driver associated with the storage device 240, it cannot directly access to the storage device 240 and can access to the storage device 240 only through the first virtual machine 210. The second virtual machine 220 first accesses the first virtual machine 210 by using a front-end driver and then accesses the storage device 240 by using the storage device driver of the first virtual machine 210. The first virtual machine 210 has a back-end driver corresponding to the front-end driver of the second virtual machine 220 in order to allow the second virtual machine 220 to access the first virtual machine 210.

(1) State Storing Operation

Hereinafter, a method for the first virtual machine 220 to store the state of the second virtual machine 220 will be described in detail with reference to FIG. 3. The first virtual machine 220 may store the state of the second virtual machine 220 periodically at predetermined time intervals or in response to an explicit request from a user. Alternatively, the first virtual machine 220 may store the state of the second virtual machine 220 when an input/output (I/O) device for accessing the storage device 240 is in an idle state.

Figure 3:
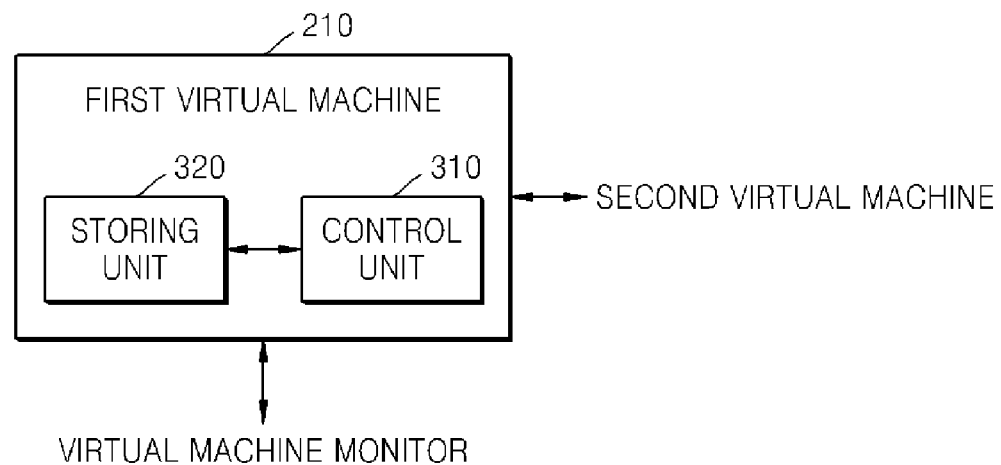
FIG. 3 illustrates virtual machines in a control domain according to an embodiment of the present invention.

FIG. 3 illustrates the first virtual machine 220 according to an embodiment of the present invention. Referring to FIG. 3, the first virtual machine 220 includes a control unit 310 and a storing unit 320.

The control unit 310 compares a current state of the second virtual machine 220 with a previous state of the second virtual machine 220, which has already been stored in the storage device 240, in order to determine whether the state of the second virtual machine 220 has changed. A method of storing the state of the second virtual machine 220 according to the current embodiment of the present invention is intended to minimize time delay occurring in moving the second virtual machine 220 to a different hardware platform by frequently storing the state of the second virtual machine 220. To this end, the control unit 310 compares the previous state of the second virtual machine 220, which has already been stored in the storage device 240, with the current state of the second virtual machine 220 in order to determine whether the state of the second virtual machine 220 has changed. The state comparison of the control unit 310 may be performed periodically at predetermined time intervals or when the virtual machine monitor 230 or the storage device 240 is in an idle state. The stored state of the second virtual machine 220 may be a state of a CPU register or a device register used by the second virtual machine 220 or data stored in the system memory 252.

The data stored in the system memory 252 as the state of the second virtual machine 220 will be taken as an example. The virtual machine monitor 230 allocates a portion of the system memory 252 to the second virtual machine 220, and the second virtual machine 220 stores data in the allocated memory portion and accesses the stored data. The first virtual machine 210 compares pages of the memory portion allocated to the second virtual machine 220 with memory pages that has already been stored in the storage device 240 in order to determine whether any page has changed.

Since the second virtual machine 220 accesses the allocated memory portion through the virtual machine monitor 230, the virtual machine monitor 230 has information about pages whose data has changed by the second virtual machine 220. Thus, the first virtual machine 210 receives the information from the virtual machine monitor 230 in order to determine whether any page has changed.

When the control unit 310 compares the previous state of the second virtual machine 220, which has already been stored in the storage device 240, with the current state of the second virtual machine 220, the state comparison may be performed after the previous state of the second virtual machine 220 is stored in the system memory 252 for fast comparison. In other words, instead of accessing the storage device 240 having low access speed, the latest-stored state of the second virtual machine 220 may be stored in the system memory 252 and be compared with the current state of the second virtual machine 220. At this time, only a portion of the state of the second virtual machine 220 may be stored in the system memory 252 and be compared with the current state of the second virtual machine 220.

For example, if any one of the memory pages allocated to the second virtual machine 220 has changed since the latest state-storing operation, the memory pages before the change may be temporarily stored in another portion of the system memory 252 and then be compared with the memory pages at the time of a next state-storing operation.

The storing unit 320 stores only the state of the second virtual machine 220, which is determined by the control unit 310 to have changed, in the storage device 240. More specifically, the storing unit 320 accesses the storage device 240 by using the storage device driver and stores the changed state in the storage device 240.

For example, the storing unit 320 stores only changed memory pages in the storage device 240. In other words, the storing unit 320 does not store, in the storage device 240, a memory page corresponding to a case where current data stored in the memory portion allocated to the second virtual machine 220 is the same as previous data that has already been stored in the storage device 240.

The storing unit 320 does not store, in the storage device 240, data of an invalid page that is not used by the OS of the second virtual machine 220. Some of pages of the memory portion allocated to the second virtual machine 220 by the virtual machine monitor 230 are not actually used by the second virtual machine 220. The virtual machine monitor 230 may check a page table including pages used by the OS of the second virtual machine 220 in order to recognize the invalid page, and the first virtual machine 210 does not store data of the invalid page in the storage device 240 by referring to the page table.

In other words, memory pages stored by the first virtual machine 210 in the storage device 240 at the time of a state storing operation are memory pages that have changed since the latest state-storing operation from among memory pages that are actually used by the second virtual machine 220.

When the first virtual machine 210 stores the changed memory pages in the storage device 240, it is more desirable to store only a difference between previous memory pages that have already been stored in the storage device 240 and current memory pages in the storage device 240 than to erase all the previous memory pages from the storage device 240 and then store the current memory pages in the storage device 240, as will be described in detail with reference to FIG. 4.

Figure 4:
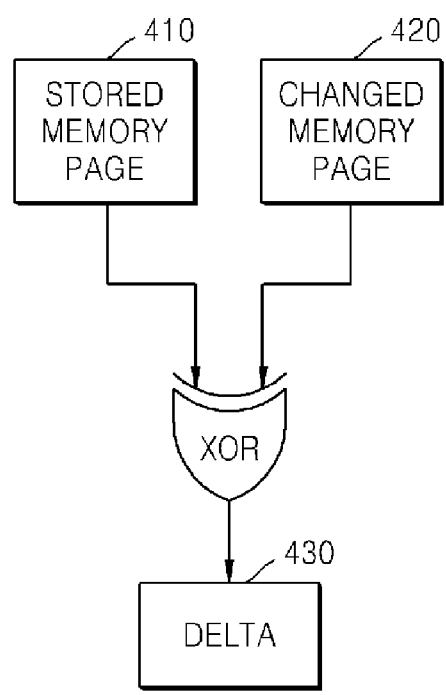
FIG. 4 is a diagram for explaining a method of calculating a difference between memory pages according to an embodiment of the present invention.

FIG. 4 is a diagram for explaining a method of calculating a difference between memory pages according to an embodiment of the present invention.

Referring to FIG. 4, the storing unit 320 generates a different DELTA 430 between memory pages by performing an exclusive OR (XOR) operation on a previous memory page (or a stored memory page) 410 that has already been stored in the storage device 240 and a current memory page (or a changed memory page) 420 in bit units. The current memory page 420 is a memory page that is determined by the control unit 310 to have changed from among memory pages allocated to the second virtual machine 220.

At this time, the generated difference 430 is additionally stored in the storage device 240 without erasing the previous memory page 410 from the storage device 240. In an exemplary embodiment, the generated difference 430 is stored in the storage device 240 after being compressed by using a predetermined algorithm.

In order to store a memory page during a next state-storing operation after storing the difference 430, the current memory page 420 is restored by reflecting the difference 430 into the previous memory page 410 and a difference between the restored memory page 420 and the memory page to be stored is calculated and then additionally stored in the storage device 240, as will be described with reference to FIG. 5.

Figure 5:
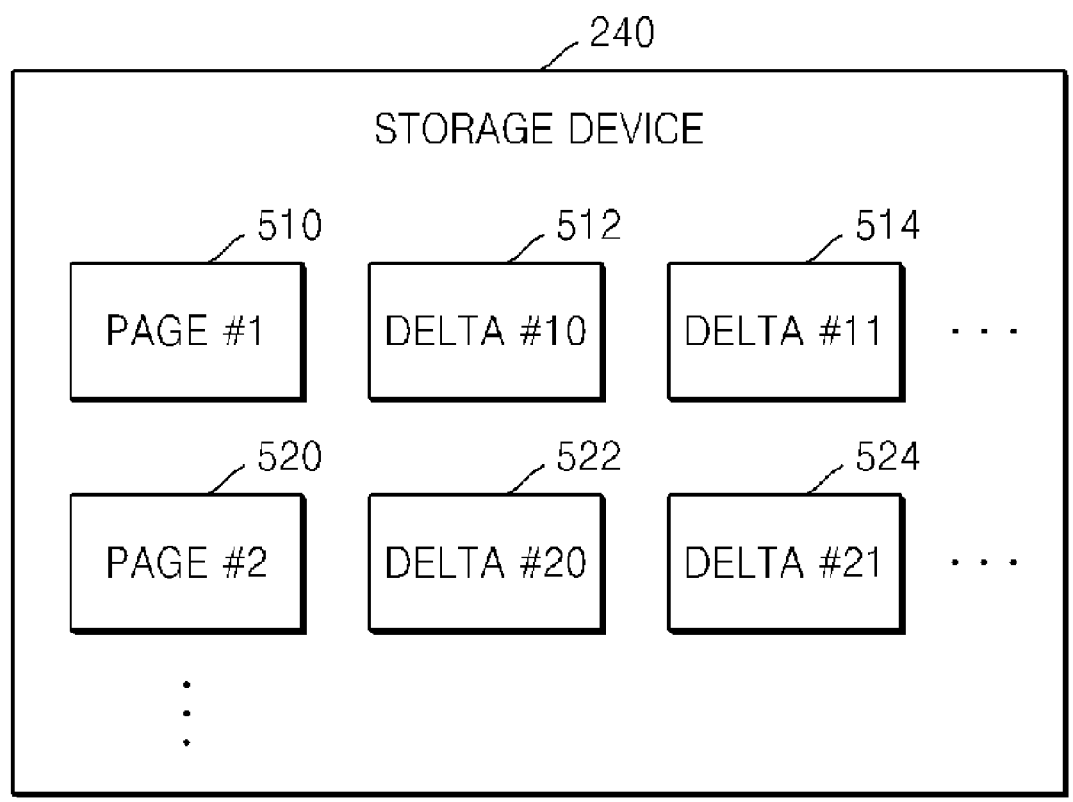
FIG. 5 is a diagram for explaining a method of storing memory pages according to an embodiment of the present invention.

FIG. 5 is a diagram for explaining a method of storing memory pages according to an embodiment of the present invention.

Memory pages stored in the storage device 240 include a memory page stored during an initial state-storing operation and differences stored during state-storing operations after the initial state-storing operation. By way of example, it is assumed that data of memory pages #1, #2, #3, and the like is stored in the storage device 240.

During an initial state-storing operation, a memory page #1 510 is initially stored in the storage device 240. During a second state-storing operation, a first difference DELTA #10 512 between the memory page #1 510, which has been stored during the initial state-storing operation, and a memory page #1 at the time of the second state-storing operation is stored in the storage device 240.

During a third state-storing operation, the memory page #1 at the time of the second state-storing operation is restored by reflecting the first difference DELTA #10 512 into the initially stored memory page #1 510, and a second difference DELTA #20 514 between the memory page #1 at the time of the second state-storing operation and a memory page #1 at the time of the third state-storing operation is stored in the storage device 240.

Likewise, for a second memory page #2 520, a process of storing a difference is repeated. The storing unit 320 separately stores a difference corresponding to memory pages that are determined by the control unit 310 to have changed since the latest state-storing operation.

Referring back to FIG. 3, in order for the storing unit 320 to accurately store a state of the second virtual machine 220 at a particular point in time, it may request the second virtual machine 220 to stop its operation and store a current state of the stopped second virtual machine 220 in the storage device 240, which is called a stop-and-go manner. However, the stop-and-go manner is not desirable because the first virtual machine 210 affects the operation of the second virtual machine 220. In particular, when the second virtual machine 220 is executing a process that requires real-time processing, the stop-and-go manner is not desirable.

Thus, when the storing unit 320 performs a state-storing operation, the virtual machine monitor 230 temporarily copies the current state of the second virtual machine 220 in another portion of the system memory 252. The second virtual machine 220 continues executing the ongoing process based on the temporarily copied current state. Once the storing unit 320 completes the state storing operation during the process execution of the second virtual machine 220, the virtual machine monitor 230 erases the temporarily copied current state.

By way of example, it is assumed that the storing unit 320 stores the memory page #1 in the storage device 240 when the second virtual machine 220 may access a memory page #1 and executes a process regarding the memory page #1.

The virtual machine monitor 230 temporarily copies the memory page #1 accessed by the second virtual machine 220 in order to generate a shadow page copy. The second virtual machine 220 continues executing the process by using the shadow page copy. When the first virtual machine 210 completes a state-storing operation, the virtual machine monitor 230 pastes the shadow page copy to the original memory page #1 and then erases the shadow page copy.

(2) State Restoring Operation

Hereinafter, a method for a virtual machine monitor to restore a state of a virtual machine, which has been stored in a predetermined storage device, will be described in detail with reference to FIG. 6. In this method, instead of restoring a state of a virtual machine at a time, only a state required in each stage of a state-restoring operation is restored in a storage device in order to be used for a state-storing operation.

Figure 6:
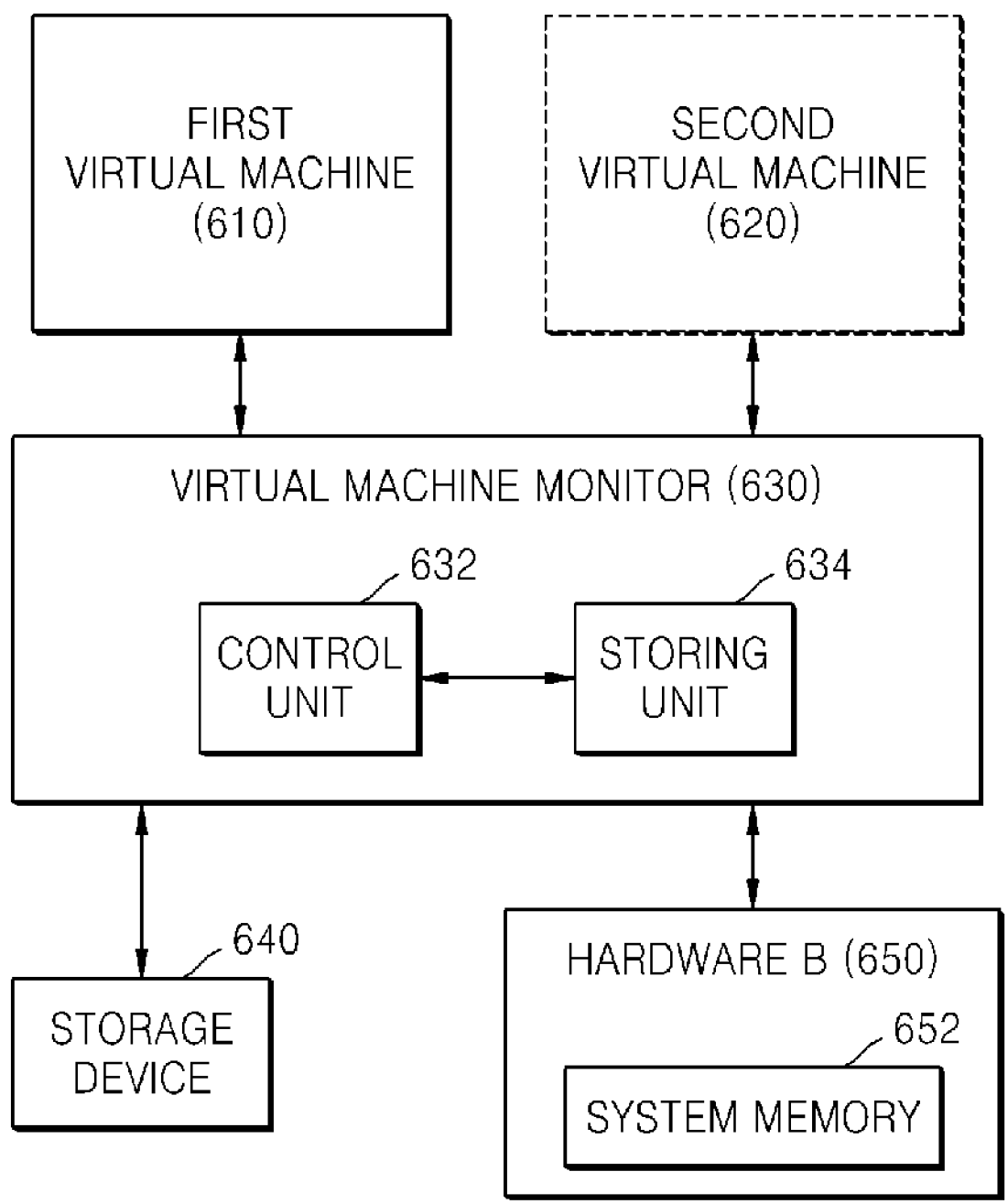
FIG. 6 illustrates a virtual machine monitor and virtual machines according to another embodiment of the present invention.

FIG. 6 illustrates a virtual machine monitor 630 and virtual machines 610 and 620 according to another embodiment of the present invention.

Referring to FIG. 6, a first virtual machine 610, which is a virtual machine in a control domain, calls a process of restoring a state of a second virtual machine 620, which is a virtual machine in a guest domain, from hardware B 650. More specifically, a state storing/restoring application of the first virtual machine 610 calls the process of restoring the state of the second virtual machine 620, which is stored in a storage device 640. The first virtual machine 610 has a storage device driver capable of accessing the storage device 640 and can access the storage device 640 through the virtual machine monitor 630.

In response to a call from the first virtual machine 610, the virtual machine monitor 630 accesses the storage device 640 by using the storage device driver of the first virtual machine 610 and restores a state of the second virtual machine 620.

A case where data of a memory portion allocated to the second virtual machine 620 is restored will be taken as an example. In this case, it is assumed that the data of the allocated memory portion is restored after a global state of the second virtual machine 620, i.e., a state of a CPU register or a device register used by the second virtual machine 620, is restored.

A control unit 632 receives a request for an access to data of a predetermined memory page from the second virtual machine 620. In response to the request, the control unit 632 determines whether the access-requested memory page has already been restored.

If the control unit 632 determines that the access-requested memory page has already been restored, it does not need to restore the access-requested memory page. However, if the control unit 632 determines that the access-requested memory pages has not yet been restored, the control unit 632 allocates an additional memory portion for storing the access-requested memory page to the second virtual machine 620 and stores the data of the access-requested memory page in the allocated memory portion. The virtual machine monitor 630 has a shadow page table indicating one-to-one correspondences between pseudo physical addresses and machine addresses in order to relay the second virtual machine 620 to the system memory 652. Thus, the control unit 632 may allocate the additional memory portion to the second virtual machine 620 by modifying the shadow page table on the virtual machine monitor 630. In other words, the control unit 632 can allocate the additional memory portion to the second virtual machine 620 by modifying the shadow page table indicating one-to-one correspondences between a pseudo physical address used for the second virtual machine 620 to access its allocated memory portion and a machine address that is an actual address of the system memory 652.

In the method of restoring the state of the second virtual machine 620 according to the current embodiment of the present invention, in the case of the state of the second virtual machine 620, especially data stored in a memory portion of the system memory 652, which has been allocated to the second virtual machine 620, only a memory page required in each stage of a state-restoring operation, instead of the entire stored data, is restored. Since only a memory page to which an access is requested by the second virtual machine 620 is read from the storage device 640 and then stored in a memory portion allocated to the second virtual machine 620, time delay occurring in the state-restoring operation can be minimized.

If data to which an access is requested by the second virtual machine 620 does not exist in the system memory 652, a memory management unit for managing a memory portion allocated to the second virtual machine 620 notifies the virtual machine monitor 630 that a page fault occurs. Upon receipt of the page fault, the virtual machine monitor 630 accesses the storage device 640 by using the storage device driver of the first virtual machine 620 and stores the access-requested data in the system memory 652.

When the control unit 632 allocates a memory portion for restoring an access-requested memory page, a memory deficiency may occur in the system memory 652. The memory deficiency may occur when resources of hardware that stores a state of a virtual machine are different from resources of hardware that restores the state of the virtual machine, especially when an environment of the hardware for restoring the state of the virtual machine is poorer than that of the hardware for storing the state of the virtual machine.

When a memory capacity stored in the storage device 640 as the state of the second virtual machine 620 exceeds a memory capacity that can be allocated to the second virtual machine 620 within the entire capacity of the system memory 652, the memory deficiency occurs. According to the related art, since the entire memory portion used by hardware before the state of the second virtual machine 620 is stored is restored at a time, the state of the second virtual machine 620 cannot be restored if the capacity of the system memory 652 of the hardware B 650 is deficient.

However, according to the present invention, since the virtual machine monitor 630 restores only a memory page required during a state-restoring operation for the second virtual machine 620, i.e. a memory page to which an access is requested by the second virtual machine 620, it can restore the state of the second virtual machine 620 even when a memory deficiency occurs in the system memory 652 of the hardware B 650.

In addition, the virtual machine monitor 630 may reserve a memory portion by erasing a least recently used memory page from among memory pages allocated to the second virtual machine 620 and allocate the reserved memory portion for a memory page to which an access is requested by the second virtual machine 620, thereby operating the second virtual machine 620 in a deficient hardware resource environment.

The storing unit 634 stores data to which an access is requested by the second virtual machine 620 in a memory portion allocated by the control unit 632. When data of a memory page includes a memory page that is initially stored during an initial state-storing operation and differences that are stored after a second state-storing operation as illustrated in FIG. 5, the differences are sequentially reflected into the initially stored memory page in order to generate a memory page to be stored in the system memory 652 and the generated memory page is stored in the memory portion allocated by the control unit 632.

For example, referring to FIG. 5, the first difference DELTA #10 512 is reflected into the initially-stored memory page #1 510 and the second difference #11 514 is reflected into a memory page #1 that is generated as a result of the reflection of the first difference DELTA #10 512, thereby generating a final memory page to be stored in a memory.

Figure 7:
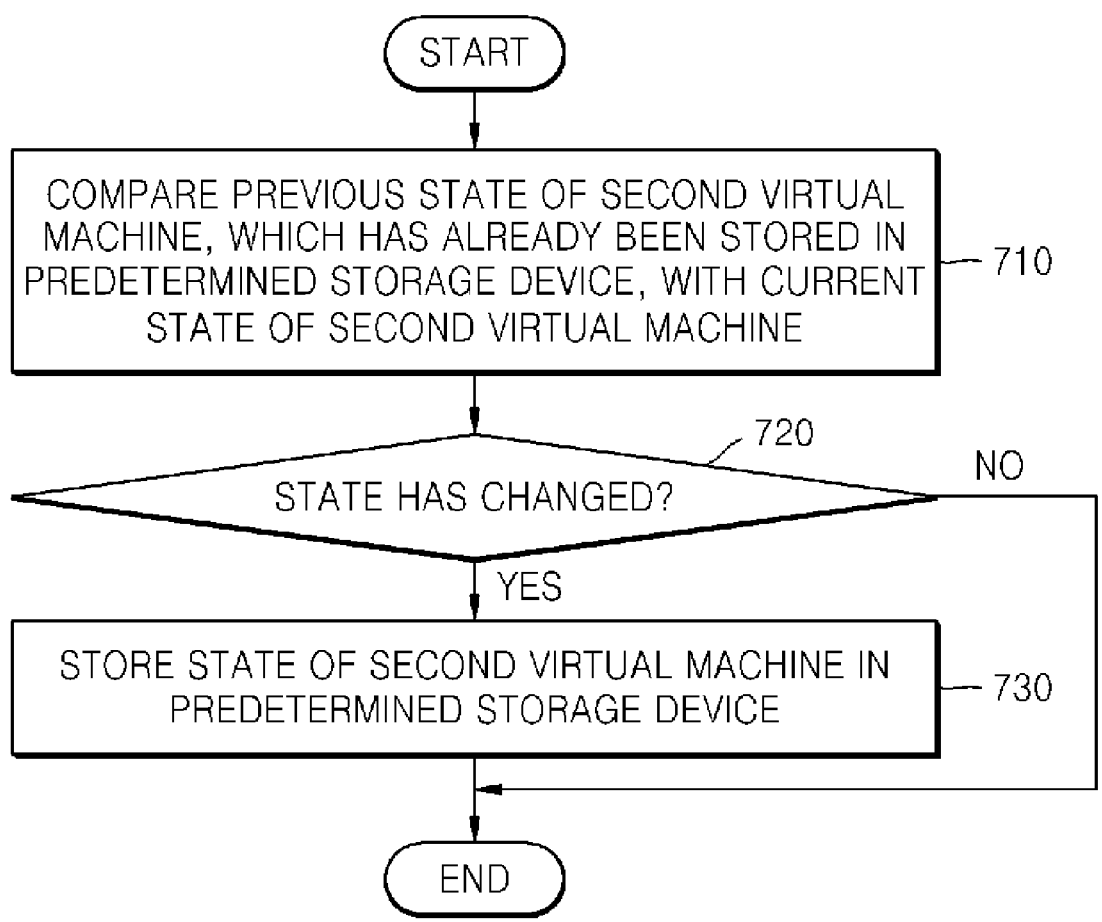
FIG. 7 is a flowchart illustrating a method of storing a state of a virtual machine according to an embodiment of the present invention.

FIG. 7 is a flowchart illustrating a method of storing a state of a virtual machine according to an embodiment of the present invention.

Referring to FIG. 7, a first virtual machine compares a previous state of a second virtual machine, which has already been stored in a predetermined storage device, with a current state of the second virtual machine in operation 710. More specifically, the first virtual machine compares the state of the second virtual machine the first virtual machine has stored with the current state of the second virtual machine. The first virtual machine and the second virtual machine are virtual machines on a virtual machine monitor operating in a single hardware platform, and the first virtual machine is a virtual machine in a control domain for storing/restoring the state of the second virtual machine and the second virtual machine is a virtual machine in a guest domain for executing a predetermined application. The stored state of the second virtual machine may be a state of a CPU register or a device register, or data stored in a memory portion allocated to the second virtual machine.

The method of storing a state of a virtual machine according to the current embodiment of the present invention frequently stores the state of the virtual machine, thereby minimizing time consumed in storing the state of the virtual machine when the virtual machine is moved to a different hardware platform. To this end, in operation 710, the first virtual machine compares the previous state of the second virtual machine with the current state of the second virtual machine.

When the data stored in the memory portion allocated to the second virtual machine is stored as the state of the second virtual machine, the first virtual machine compares previous memory pages that have already been stored in the storage device with current memory pages allocated to the second virtual machine.

In operation 720, the first virtual machine determines whether the state of the second virtual machine has changed based on the comparison performed in operation 710.

For example, since the second virtual machine accesses a memory portion allocated to itself by a virtual machine monitor, the virtual machine monitor has information about memory pages that are accessed by the second virtual machine and changed by the second virtual machine. Thus, the first virtual machine receives the information from the virtual machine monitor in order to determine whether any one of the memory pages has changed.

In operation 730, the first virtual machine stores the state of the second virtual machine in the storage device. If the first virtual machine determines that the state of the second virtual machine has changed in operation 720, the first virtual machine stores the state of the second virtual machine in operation 730. On the other hand, if the first virtual machine determines that the state of the second virtual machine has not changed in operation 720, the first virtual machine does not store the state of the second virtual machine.

At this time, only a changed portion of the state, instead of the entire state of the second virtual machine, is stored. For example, only a memory page that has changed since the latest state-storing operation is stored in the storage device. In this case, as mentioned previously, only a difference between a memory page stored during the latest state-storing operation and a changed current memory page may be repetitively stored. In addition, data of a memory page that is not actually used by the second virtual machine from among the memory pages allocated to the second virtual machine is not stored.

Figure 8:
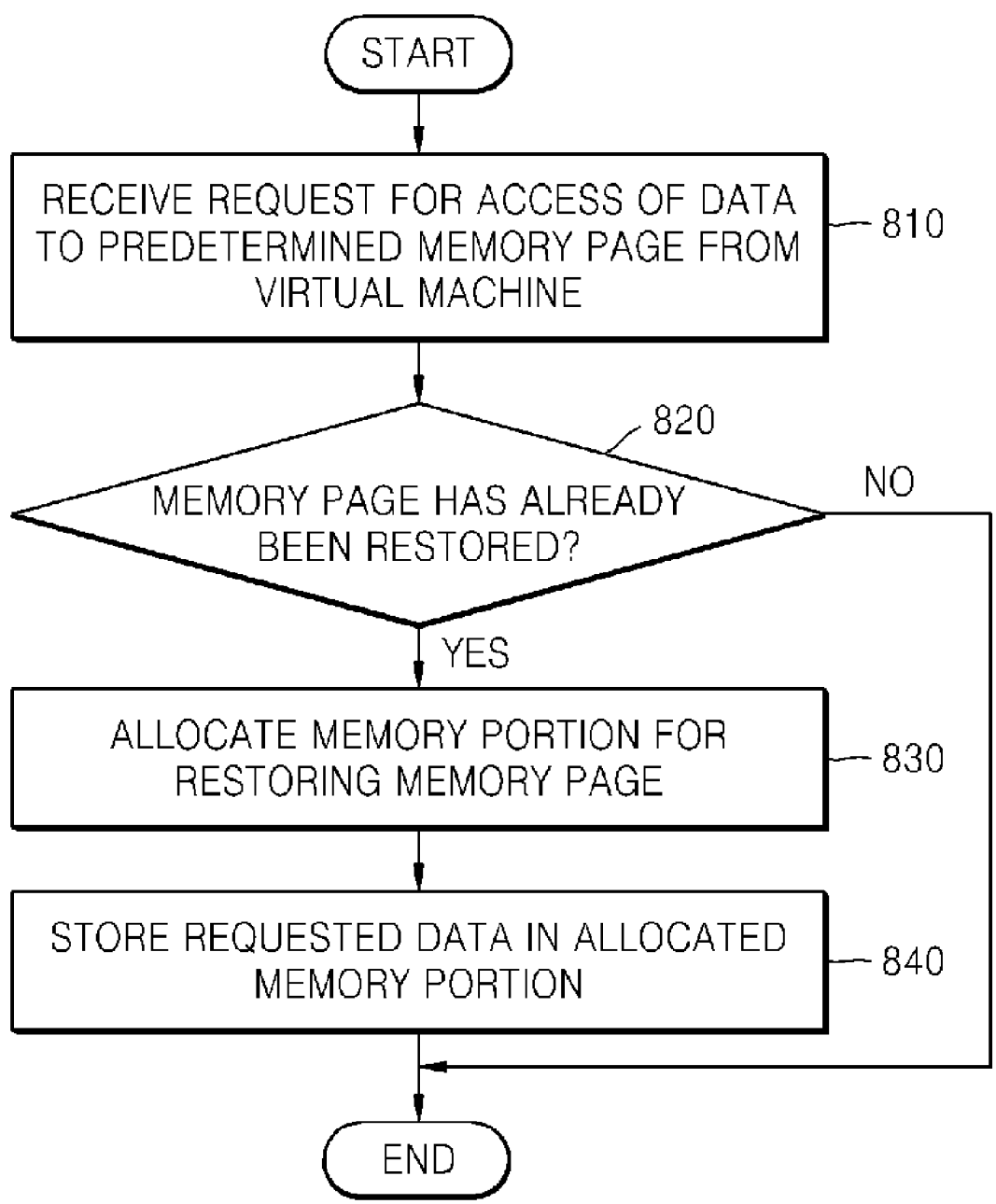
FIG. 8 is a flowchart illustrating a method of restoring a state of a virtual machine according to an embodiment of the present invention.

FIG. 8 is a flowchart illustrating a method of restoring a state of a virtual machine according to an embodiment of the present invention. In FIG. 8, after a global state of a virtual machine such as a state of a CPU register or a device register is restored, data of a memory portion allocated to the virtual machine is restored.

Referring to FIG. 8, in operation 810, a virtual machine monitor receives a request for an access to a predetermined memory page from the virtual machine.

In operation 820, the virtual machine monitor determines whether the access-requested memory page has already been restored. According to the current embodiment of the present invention, the virtual machine monitor restores only a memory page required during a predetermined process executed by the virtual machine, instead of collectively restoring all memory pages allocated to the virtual machine. Thus, the virtual machine monitor determines whether the access-requested memory page has been restored and stored in the memory portion allocated to the virtual machine.

If the access-requested memory page has not yet been restored, a memory management unit for managing the memory portion allocated to the virtual machine generates a page default. Thus, if the virtual machine monitor receives the page fault from the memory management unit, the access-requested memory page has not yet been restored.

If it is determined that the access-requested memory page has not yet been restored in operation 820, the virtual machine monitor allocates a memory portion for restoring the access-requested memory page in operation 830. At this time, an additional memory portion for storing the access-requested memory page may be allocated. Alternatively, a least recently used memory page may be erased from a memory in order to reserve a memory portion and allocates the reserved memory portion for the access-requested memory page.

Since the virtual machine monitor manages a shadow page table indicating one-to-one correspondences between pseudo physical addresses and machine addresses, the virtual machine monitor can allocate the additional memory portion for restoring the access-requested memory page by modifying the shadow page table.

In operation 840, the virtual machine monitor stores the data of the access-requested memory page in the memory portion allocated in operation 830. To this end, the virtual machine monitor reads the data of the access-requested memory page from the storage device and stores the read data in the allocated memory portion.

As described above, according to the present invention, only a difference between a previously stored state of a virtual machine and a current state of the virtual machine can be frequently stored, thereby minimizing time delay occurring when the virtual machine is moved to a different hardware platform.

Moreover, when the state of the virtual machine is restored, only a memory page required for operating the virtual machine can be selectively restored, thereby minimizing time delay and allowing a state-restoring operation to be performed even in a hardware platform with a deficient system memory.

The present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A method of storing a state of a second virtual machine in a predetermined storage device by a first virtual machine on a virtual machine monitor, the method comprising:
   determining whether the state of the second virtual machine has changed, by comparing a previous state of the second virtual machine stored in the storage device, with a current state of the second virtual machine, wherein the state of the second virtual machine comprises data stored in a memory portion allocated to the second virtual machine; and
   selectively storing the current state of the second virtual machine based on a result of the determining,
   wherein the determining comprises determining whether any one of memory pages of the memory, stored in the storage device, has changed, by comparing previous memory pages with current memory pages, and the selectively storing of the current state comprises storing data of changed memory page in the storage device.

2. The method of claim 1, wherein the storing of only data of the changed memory page comprises:
   calculating a difference between data of a memory page stored in the storage device and the data of the changed memory page; and
   storing the difference in the storage device.

3. The method of claim 1, wherein the storing of only data of the changed memory page comprises storing data of remaining memory pages of memory pages allocated to the second virtual machine except for a memory page that is not used by the second virtual machine.

4. The method of claim 1, wherein the state of the second virtual machine comprises at least one of a state of a central processing unit (CPU) register and a state of a device register of the second virtual machine.

5. The method according to claim 1, wherein the first virtual machine stores the state of the second virtual machine periodically at predetermined time intervals.

6. A non-transitory computer-readable recording medium, executed by a processor, having recorded thereon a program for executing the method of claim 1.

7. A method of restoring a state of a virtual machine, which is stored in a predetermined storage device, by a virtual machine monitor, the method comprising:
   receiving a request for an access to data of a predetermined memory page from the virtual machine;
   determining whether the predetermined memory page has already been restored; and
   if, based on the determining, the predetermined memory page has not been restored, restoring the predetermined memory page by allocating an additional memory portion for restoring the predetermined memory page and storing the access-requested data in the allocated additional memory portion according to a result of the determining, wherein a memory page required for a state-restoring operation is restored.

8. The method of claim 7, wherein the allocating the additional memory portion and the storing of the access-requested data comprises:
   allocating the additional memory portion for restoring the predetermined memory page, to the virtual machine if it is determined that the predetermined memory page has not yet been restored;
   receiving the access-requested data of the predetermined memory page from the storage device; and
   storing the received access-requested data in the allocated additional memory portion.

9. The method of claim 7, wherein the allocating the memory portion and the storing of the access-requested data comprises:
- allocating a memory portion that has been allocated to a least recently used memory page for restoring the predetermined memory page if it is determined that the predetermined memory page has not yet been restored;
- receiving the access-requested data of the predetermined memory page from the storage device; and
- storing the received access-requested data in the allocated memory portion.

10. The method of claim 7, wherein the determining comprises determining whether a page fault is received from a memory management unit for managing a memory portion allocated to the virtual machine.

11. A non-transitory computer-readable recording medium, executed by a processor, having recorded there on a program for executing the method of claim 7.

12. An apparatus for storing a state of a second virtual machine in a predetermined storage device by a first virtual machine on a virtual machine monitor, the apparatus comprising:
- a control unit which determines, in a determination, whether the state of the second virtual machine has changed, by comparing a previous state of the second virtual machine stored in the storage device, with a current state of the second virtual machine; wherein the state of the second virtual machine comprises data stored in a memory portion allocated to the second virtual machine; and
- a storing unit selectively which stores the current state of the second virtual machine based on a result of the determination,
- wherein the control unit determines whether any one of memory pages of the memory, stored in the storage device, has changed, by comparing previous memory pages with current memory pages, and the storing unit stores data of changed memory page in the storage device.

13. The apparatus of claim 12, wherein the storing unit calculates a difference between data of a memory page stored in the storage device and the data of the changed memory page and stores the difference in the storage device.

14. The apparatus of claim 12, wherein the storing unit stores data of remaining memory pages of memory pages allocated to the second virtual machine except for a memory page that is not used by the second virtual machine.

15. The apparatus of claim 12, wherein the state of the second virtual machine comprises at least one of a state of a central processing unit (CPU) register and a state of a device register of the second virtual machine.

16. An apparatus for restoring a state of a virtual machine which is stored in a predetermined storage device, by a virtual machine monitor, the apparatus comprising:
- a control unit which receives a request for an access to data of a predetermined memory page from the virtual machine, determines, in a determination, whether the predetermined memory page has already been restored, and if, based on the determination, the predetermined memory page has not been restored, the control unit allocates an additional memory portion for restoring the predetermined memory page; and
- a storing unit which stores the access-requested data in the allocated additional memory portion according to a result of the determination, wherein a memory page required for a state-restoring operation is restored.

17. The apparatus of claim 16, wherein the control unit allocates the additional memory portion for restoring the predetermined memory page, to the virtual machine if it is determined that the predetermined memory page has not yet been restored, and the storing unit receives the access-requested data of the predetermined memory page from the storage device and stores the received access-requested data in the allocated additional memory portion.

18. The apparatus of claim 16, wherein the control unit allocates a memory portion that has been allocated to a least recently used memory page for restoring the predetermined memory page if it is determined that the predetermined memory page has not yet been restored, and the storing unit receives the access-requested data of the predetermined memory page from the storage device and stores the received access-requested data in the allocated memory portion.

19. The apparatus of claim 16, wherein the control unit determines whether a page fault is received from a memory management unit for managing a memory portion allocated to the virtual machine.

* * * * *